United States Patent
Taylor et al.

[11] Patent Number: 6,116,015
[45] Date of Patent: Sep. 12, 2000

[54] BREATHER OUTLET

[75] Inventors: Kathryn V Taylor; Ian J Mylemans; Stephen P Hyde; Graham P Daws, all of Derby, United Kingdom

[73] Assignee: Rolls-Royce plc, London, United Kingdom

[21] Appl. No.: 09/247,905

[22] Filed: Feb. 11, 1999

[30] Foreign Application Priority Data

Mar. 6, 1998 [GB] United Kingdom ................... 9804807

[51] Int. Cl.$^7$ ....................................................... F02C 7/06
[52] U.S. Cl. .......................................... 60/39.08; 60/39.33
[58] Field of Search ................................. 60/39.33, 39.08

[56] References Cited

U.S. PATENT DOCUMENTS

| 3,041,832 | 7/1962 | Atkinson | 60/39.08 |
| 4,172,572 | 10/1979 | Doig . | |

FOREIGN PATENT DOCUMENTS

| 0439923 A1 | 8/1991 | European Pat. Off. . |
| 2112077 | 7/1983 | United Kingdom . |

Primary Examiner—Charles G. Freay
Assistant Examiner—Ehud Gartenberg
Attorney, Agent, or Firm—W. Warren Taltavull; Earkas & Manelli PLLC

[57] ABSTRACT

A breather outlet (14) for the gearbox of a gas turbine engine comprises a mast (18) which extends from the nacelle (10) of the gas turbine engine. The mast (18) contains a breather duct (20) which interconnects the interior of the gearbox with an exhaust outlet (22). The mast (18) has an aerodynamic main portion (25) and a sub portion (27) extending rearwardly from the main portion (25). The exhaust outlet (22) is in the sub portion (27) and is arranged to direct oil and air in a downstream direction. The exhaust outlet (22) is spaced from the trailing edge (26) of the main portion (25), the sub portion (27 has guide vanes (28) in the breather duct (20) to straighten the oil and air flow and vortex generators (30) are provided on the mast to avoid oil staining of the nacelle (10).

27 Claims, 2 Drawing Sheets

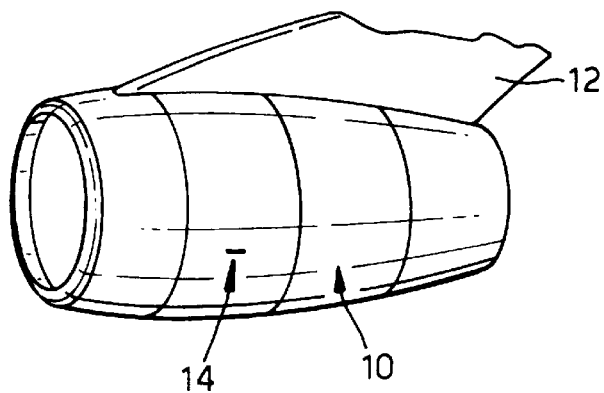
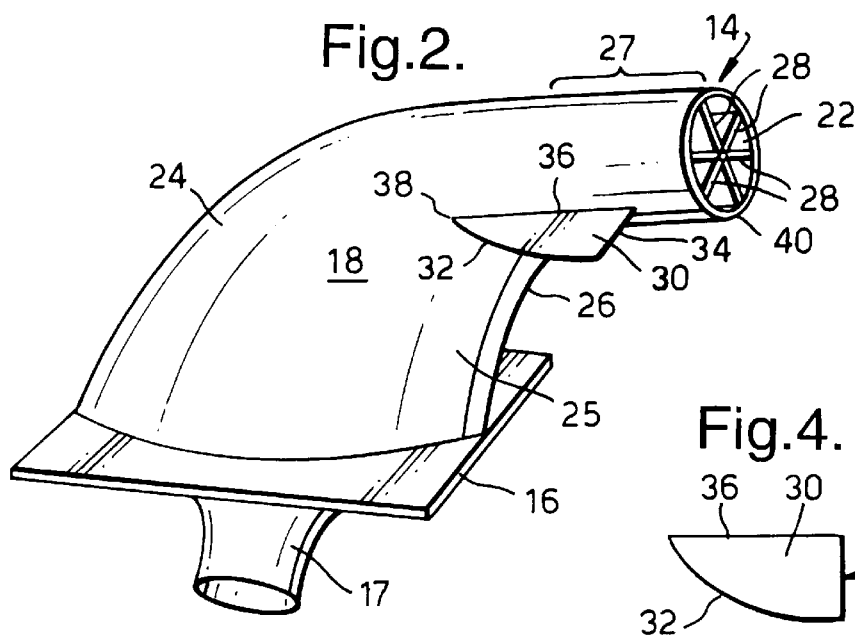
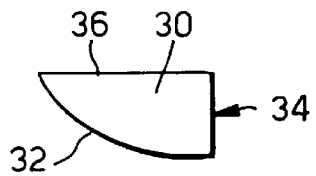
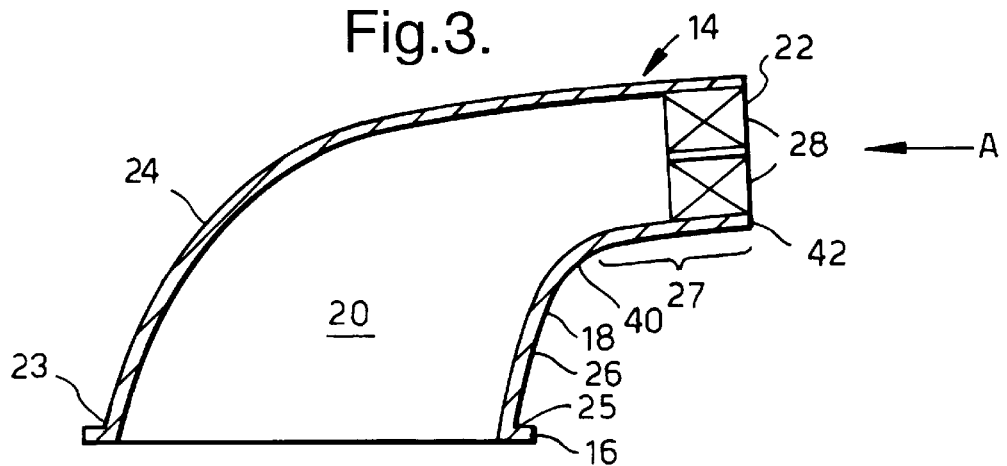

BREATHER OUTLET

The present invention relates generally to a breather outlet, particularly to a gearbox breather outlet for an aircraft mounted gas turbine engine.

Aircraft mounted gas turbine engines are usually provided with a gearbox which is driven by the engine and provides drive for certain engine accessories. Such gearboxes are oil lubricated and are provided with so called "breather" outlets to provide communication between the gearbox interior and the exterior of the engine. This is to ensure that the operation of the gearbox does not result in an air pressure build up within the gearbox to casing. Inevitably operation of the gearbox results in severe agitation of the oil with in the gearbox to the extent that an oil mist is usually formed. This oil mist can escape through the gearbox breather outlet and so it is common to provide a centrifuge device in the breather to separate out the oil mist before it is ejected from the engine. Unfortunately such devices are not completely effective in providing the capture of all the oil mist so that some oil is inevitably lost through the breather outlet. The magnitude of the oil loss under these circumstances is not great and does not normally present any problems in the effective operation of the gearbox. However the oil which is ejected from the breather outlet tends to cause dark coloured stains along the engine nacelle. The problem is particularly acute in the case of engine nacelles which are light coloured.

Such stains are seen as being highly undesirable since they are unsightly and are very difficult and time consuming to remove by normal cleaning methods.

European patent EP0439923B1, published Aug. 7, 1991, describes a breather outlet which attempted to overcome these problems. That breather outlet comprises an aerodynamic mast extending from the gas turbine engine nacelle, the mast contains a breather duct having an exhaust outlet, the exhaust outlet is generally rearwardly facing with respect to the operational flow of air over the mast and the exhaust outlet is spaced apart from the engine nacelle to minimise interaction between any efflux from the exhaust outlet and the nacelle.

The breather outlet described in European patent EP0439923B1 reduced the amount of staining of the engine nacelle but has not completely cured the problem.

Accordingly the present invention seeks to provide a breather outlet which further reduces the above mentioned problem.

Accordingly the present invention provides a breather outlet suitable for use with the gearbox of an aircraft mounted gas turbine engine enclosed within a nacelle, the breather outlet comprising a mast containing a breather duct, the mast being adapted to be located on the exterior of the nacelle, the breather duct being operationally interconnected with the interior of the gearbox, the mast comprising a main portion and a sub portion extending generally rearwardly from the main portion, the main portion of the mast being generally aerodynamically shaped between a leading edge and a trailing edge, the sub portion of the mast having an exhaust outlet for the breather duct, the exhaust outlet being generally rearwardly facing with respect to the operational flow of air over the mast and positioned so as to be spaced apart from the nacelle, the exhaust outlet being spaced from the trailing edge of the main portion of the mast, and the mast having vortex generators spaced from the exhaust outlet to generate vortices in the operational flow of air over the mast to act as a barrier between the airflow through the exhaust outlet and the wake from the mast.

Preferably there are two vortex generators, each vortex generator has a leading edge, a trailing edge and an attachment edge for securing the vortex generator to the mast. Preferably the vortex generators are arranged at an angle of 14° to the nacelle.

Preferably the point of intersection of the leading edge and attachment edge of the vortex generators is at substantially the same distance from the nacelle as the nearest point of the exhaust outlet to the nacelle.

Preferably the attachment edges of the vortex generators are arranged substantially either side of the mast and are substantially coplanar and the vortex generators extend from the mast such that the vortex generators are arranged substantially in the same plane.

Preferably the attachment edges of the vortex generators are approximately 120° apart.

Preferably the exhaust outlet is arranged at an angle to direct the airflow away from the nacelle.

Preferably the breather duct has means to remove the swirl present in the operational airflow through the breather duct. Preferably the means to remove the swirl is located in the breather duct in the sub portion of the mast. Preferably the means to remove the swirl is located at the exhaust outlet.

Preferably the means to remove the swirl comprises a plurality of vanes extending across the breather duct in the sub portion of the mast. Preferably the sub portion has a circular cross-section. Preferably the axial length of the vanes is two to three times the radius of the sub-portion of the mast. Preferably there are six vanes.

Preferably the trailing edges of the vortex generators are spaced a distance from the exhaust outlet substantially the same as the radius of the exhaust outlet. Preferably the trailing edges of the vortex generators extend from the mast by a length of 1.0 to 1.5 times the radius of the exhaust outlet. Preferably the attachment edges of the vortex generators have a length of 2.0 to 3.5 times the radius of the exhaust outlet 22.

Preferably the exhaust outlet has a radius of 25 mm, the vanes have a length of 50 to 75 mm, the trailing edges of the vortex generators are spaced 25 mm from the exhaust outlet, the trailing edges of the vortex generators extend 32 mm from the mast, the attachment edges of the vortex generators have a length of 86 mm, the exhaust outlet is spaced at least 50 mm from the main portion of the mast, the point of intersection of the leading edge of the vortex generator and the attachment edge of the vortex generator is substantially 12 cm from the nacelle and the nearest point of the exhaust outlet is substantially 12 cm from the nacelle.

Preferably each vortex generator has a parabolic leading edge, but other shapes of leading edge may be used.

The present invention will be more fully described by way of example with reference to the accompanying drawing, in which:

FIG. 1 is a general view of an aircraft mounted gas turbine engine nacelle incorporating a breather outlet according to the present invention.

FIG. 2 is an enlarged view of a breather outlet according to the present invention mounted on the nacelle shown in FIG. 1.

FIG. 3 is a cross-sectional view through the breather outlet shown in FIG. 2.

FIG. 4 is a plan view of a vortex generator shown on the breather outlet in FIG. 2.

Figure 5:
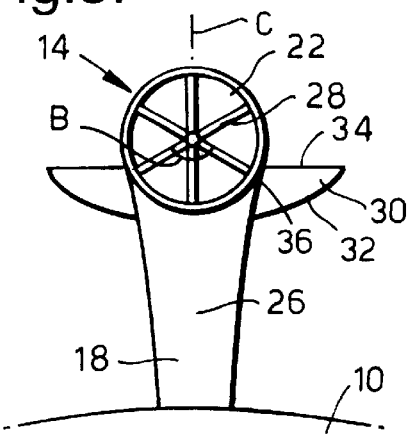
FIG. 5 is a view in the direction of arrow A in FIG. 3.

A gas turbine engine nacelle 10, shown in FIG. 1, contains a propulsive gas turbine engine suspended from an aircraft (not shown) by means of a mounting pylon 12. The gas turbine engine within the nacelle 10 is provided with a gearbox having a breather, the outlet of the breather outlet is indicated at 14. The breather outlet 14 is shown more clearly in FIGS. 2 and 3.

The breather outlet 14, as shown in FIGS. 2 and 3, extends through an apertured seal plate 16 provided on the surface of the nacelle 10. A portion of the breather outlet 14 is within the nacelle 10 comprises a transition piece connector 17 which facilitates an interconnection between the breather outlet 14 and the interior of the previously mentioned gearbox.

A portion of the breather outlet 14 outside the nacelle 10 comprises an aerodynamic mast 18. The mast 18 contains a breather duct 20 which interconnects with the gearbox interior at one end and with an exhaust outlet 22 at the other end. The exhaust outlet 22 is positioned in the mast 18 so that it is generally rearwardly, or downstream, facing with respect to the operational air flow over the nacelle 10. The exhaust outlet 22 is positioned so that it is spaced apart from the surface of the nacelle 10 by approximately 12 cm. The exhaust outlet 22 is angled so as to be directed slightly away from the nacelle 10. These arrangements are to decrease the possibility of oil coming into contact with the nacelle 10.

The mast 18 has main body portion 25 and a portion 27 which has a circular cross-sectional configuration. The mast 18 has a leading edge 24, with respect to the operational flow of air thereover, which is curved in a convex manner. Specifically the leading edge 24 extends from the most upstream part 23 to the exhaust outlet 22. The mast 18 has a trailing edge 26 which is also curved in a convex manner. The trailing edge 26 extends from the most downstream part 25 of the mast 18, which interconnects with the nacelle 10, to the point 40 of intersection with the portion 27 of the mast 14. The main body portion 25 of the mast 18 has an aerodynamic profile from the leading edge 24 to the trailing edge 26. These configurations of the leading and trailing edges 24 and 26 and the aerodynamic profile enhance the aerodynamic performance of the breather outlet 14 thereby reducing its drag.

The breather duct 20 is arranged so that it's cross-sectional configuration changes from a slot shape at it's exit from the nacelle 10 to a circular cross-sectional configuration at the exhaust outlet 22.

The breather duct 20 is provided with a plurality of, six in this example, guide vanes 28 which extend radially across the breather duct 20 in the portion 27 of the breather duct 20 which has a circular cross-sectional shape. FIGS. 2 and 3 show the guide vanes 28 provided immediately upstream of the exhaust outlet 22. It is preferable that the axial length of the guide vanes 28 is approximately two to three times the radius of the exhaust outlet 22, more preferably 2.25 to 2.5 times the radius of the exhaust outlet 22. The guide vanes 28 extend substantially the full length of the portion 27 and thus the portion 27 is also at least 2 times the length of the radius of the exhaust outlet 22. The guide vanes 28 are flow straighteners.

The portion 27 of the mast 14 extends in a rearward, or downstream, direction from the main portion 25 of the mast 14 such that the exhaust outlet 22 is spaced apart from the trailing edge 26 of the main portion 25 of the mast 14. Preferably the exhaust outlet 22 is spaced approximately twice the radius of the exhaust outlet 22 from the trailing edge 26 of the main body portion 25 of the mast 14, a spacing of more than twice the radius of the exhaust outlet does not give any significant improvement.

The mast 18 has a plurality of, two in this example, vortex generators 30 which extend from the mast 18 in the region of the portion 27 of the breather duct 20 having a circular cross-sectional shape. The vortex generators 30 have a leading edge 32, a trailing edge 34 and an attachment edge 36. The vortex generators 30 are secured to the portion 27 of the mast 18 along their attachment edges 36 by welding or other suitable means.

The leading edge 32 is preferably a parabolic line, but other suitable lines may be used, for example an elliptical line or a straight line. It is preferable that the length of the trailing edge 34 is 1.0 to 1.5 times the radius of the exhaust outlet 22 and that the length of the attachment edge 36 is 2.0 to 3.5 times the radius of the exhaust outlet 22, preferably 3.0 times the radius of the exhaust outlet 22. It is preferred that there are two vortex generators.

It is preferable that the point 38 of intersection of the leading edge 32 and attachment edge 36 of the vortex generators 30 is at substantially the same distance from the nacelle 10 as the nearest point 42 of the exhaust outlet 22 to the nacelle 10. The point 38 may be up to a few millimeters nearer to the nacelle than the point 42. The attachment edges 36 of the vortex generators 30 are arranged at an angle of approximately 14° relative to the surface of the nacelle 10 which is substantially parallel to the airflow over the mast 14. The trailing edges 34 of the vortex generators 30 are spaced apart from the exhaust outlet 22 by a distance of approximately the radius of the exhaust outlet 22.

The attachment edges 36 of the vortex generators 30 are arranged substantially either side of the mast 18 and are substantially coplanar and the vortex generators 30 extend from the mast 18 such that they are also arranged in the same plane. The attachment edges 36 of the vortex generators 30 are arranged at an angle B, where B is approximately 120° and the angle B is bisected by a radius C from the gas turbine engine.

In one example of a breather outlet according to the present invention, for large gas turbine engines, the exhaust outlet 22 of the breather duct 20 has a radius of 25 mm, the trailing edge 34 of the vortex generators 30 has a length of 32 mm, the attachment edge 36 of the vortex generator 30 has a length of 86 mm, the trailing edge 34 is 25 mm upstream of the exhaust outlet 22, the guide vanes 28 have a length of 63 mm and the exhaust outlet 22 is 50 mm from the trailing edge 26 of the main body portion 25 of the mast 14. The point 40 is approximately 12 cm from the nacelle 10 and the point 38 is approximately 12 cm from the nacelle 10.

In another example of a breather outlet according to the present invention, for a small gas turbine engines, the exhaust outlet 22 of the breather duct 20 has a radius of 12.5 mm, the trailing edge 34 of the vortex generators 30 has a length of 12.5 mm, the attachment edge 36 of the vortex generator 30 has a length of 37.5 mm, the trailing edge 34 is 12.5 mm upstream of the exhaust outlet 22, the guide vanes 28 have a length of 37.5 mm and the exhaust outlet 22 is 25 mm from the trailing edge 26 of the main body portion 25 of the mast 14.

During operation of the gas turbine engine mounted within the nacelle 10, oil is expelled in small quantities from the engine gearbox into the breather duct 20. The oil and the air in which it is suspended flows through the breather duct 20 to be finally exhausted in a generally downstream direction through the exhaust outlet 22.

The oil and air mixture flows through the guide vanes 28 in the portion 27 of the mast 14 before being exhausted through the exhaust outlet 22. The guide vanes 28 remove the swirl present in the air flow through the outlet duct 20 before the oil and air mixture is discharged from the exhaust outlet 22.

The portion 27 of the mast 14 projects downstream from the main portion of the mast 14 and thus the exhaust outlet 22 discharges the oil and air mixture into the airflow over the mast 14 further from the turbulent region just downstream of the trailing edge 26 of the main body portion 25 of the mast 14. This allows the oil and air mixture time to become steady before it is introduced into the airflow over the mast 14. The provision of the space between the exhaust outlet 22 and the trailing edge 25 is the feature giving the most significant effect.

The vortex generators 30 generate vortices in the airflow over the mast 14 and these vortices act as a barrier between the oil and mixture discharged from the exhaust outlet 22 and the turbulent flow downstream of the main body portion 25 of the mast 14. The vortices re-energise the turbulent flow and reduce boundary layer separation around the exhaust outlet 22 and thus minimise the possibility of the oil and air mixture being drawn towards the nacelle 10. Thus the vortices tend to cause the oil and air mixture to flow away from the surface of the nacelle 10.

The mast 18 of the breather outlet 14 described with reference to FIGS. 2 to 5 comprises a single skin mast, i.e. the main body portion 25 and portion 27 are formed from a single skin of metal.

Figure 6:
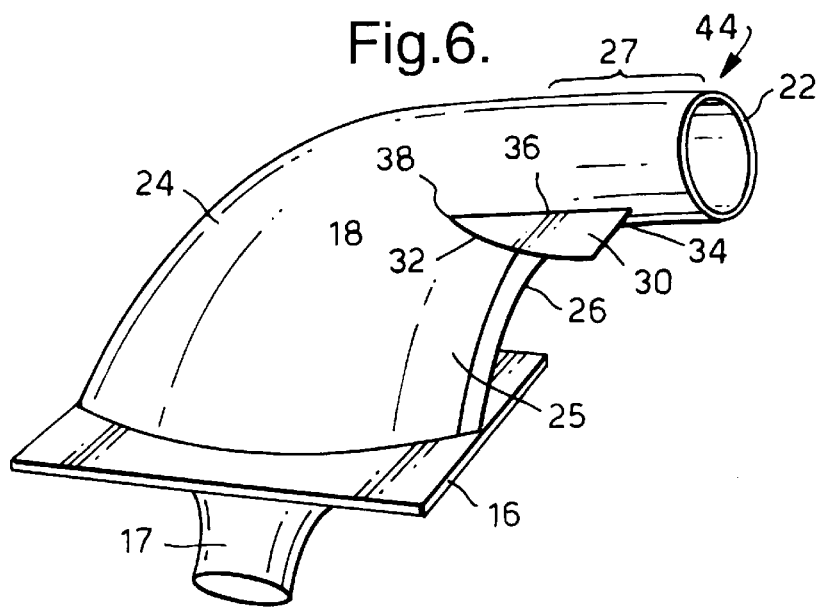
FIG. 6 is an enlarged view of another breather outlet according to the present invention mounted on the nacelle shown in FIG. 1.
Figure 7:
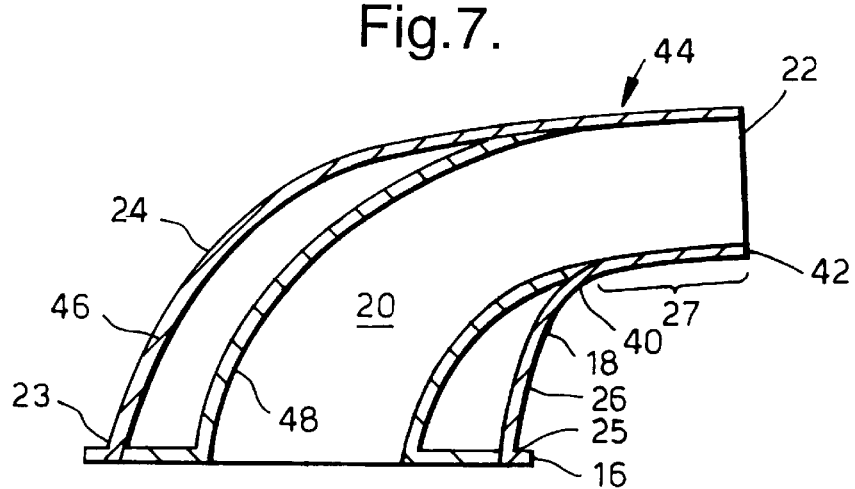
FIG. 7 is a cross-sectional view through the breather outlet shown in FIG. 6.

A further breather outlet 44 as shown in FIG. 6 and 7 is substantially the same as the breather outlet 14 in FIGS. 2 to 5, however, the mast 18 comprises an outer skin 46 and an inner skin 48 within the outer skin 46. In that case the inner skin 48 would define the outlet duct 20 and this would reduce the amount of swirl in the oil and air mixture before it was discharged from the exhaust outlet 22. It may be possible to dispense with the guide vanes in the portion 27 of the mast 18, alternatively they may be retained.

The breather outlet 14 may be positioned at any angular position on the nacelle 10 and not just at the position shown, for example it is preferable to position the breather outlet at the bottom dead centre of the nacelle 10.

The mast may be manufactured from any suitable material, for example sheet metal, fibre reinforced composite material e.g. sheet steel or graphite reinforced plastic.

We claim:

1. A breather outlet suitable for use with the gearbox of an aircraft mounted gas turbine engine enclosed within a nacelle, the breather outlet comprising a mast containing a breather duct, the mast being adapted to be located on the exterior of the nacelle, the breather duct being operationally interconnected with the interior of the gearbox, the mast comprising a main portion and a sub portion extending generally rearwardly from the main portion, the main portion of the mast being generally aerodynamically shaped between a leading edge and a trailing edge, the sub portion of the mast having an exhaust outlet for the breather duct, the exhaust outlet being generally rearwardly facing with respect to the operational flow of air over the mast and positioned so as to be spaced apart from the nacelle, the exhaust outlet being spaced from the trailing edge of the main portion of the mast, and the mast having vortex generators spaced from the exhaust outlet to generate vortices in the operational flow of air over the mast to act as a barrier between the airflow through the exhaust outlet and the wake from the mast.

2. A breather outlet as claimed in claim 1 wherein there are two vortex generators, each vortex generator has a leading edge, a trailing edge and an attachment edge for securing the vortex generator to the mast.

3. A breather outlet as claimed in claim 2 wherein the vortex generators are arranged at an angle of 14° to the nacelle.

4. A breather outlet as claimed in claim 2 wherein the point of intersection of the leading edge and attachment edge of the vortex generators is at substantially the same distance from the nacelle as the nearest point of the exhaust outlet to the nacelle.

5. A breather outlet as claimed in claim 2 wherein the attachment edges of the vortex generators are arranged substantially either side of the mast and are substantially coplanar and the vortex generators extend from the mast such that the vortex generators are arranged substantially in the same plane.

6. A breather outlet as claimed in claim 5 wherein the attachment edges of the vortex generators are approximately 120° apart.

7. A breather outlet as claimed in claim 1 wherein the exhaust outlet is arranged at an angle to direct the airflow away from the nacelle.

8. A breather outlet as claimed in claim 1 wherein the breather duct has means to remove the swirl present in the operational airflow through the breather duct.

9. A breather outlet as claimed in claim 8 wherein the means to remove the swirl is located in the breather duct in the sub portion of the mast.

10. A breather outlet as claimed in claim 9 wherein the means to remove the swirl is located at the exhaust outlet.

11. A breather outlet as claimed in claim 10 wherein the means to remove the swirl comprises a plurality of vanes extending across the breather duct in the sub portion of the mast.

12. A breather outlet as claimed in claim 8 wherein the sub portion has a circular cross-section.

13. A breather outlet as claimed in claim 12 wherein the axial length of the vanes is two to three times the radius of the sub-portion of the mast.

14. A breather outlet as claimed in claim 12 wherein there are six vanes.

15. A breather outlet as claimed in claim 12 wherein the trailing edges of the vortex generators are spaced a distance from the exhaust outlet substantially the same as the radius of the exhaust outlet.

16. A breather outlet as claimed in claim 12 wherein the trailing edges of the vortex generators extend from the mast by a length of 1 to 1.5 times the radius of the exhaust outlet.

17. A breather outlet as claimed in claim 12 wherein the attachment edges of the vortex generators have a length of 2.0 to 3.5 times the radius of the exhaust outlet.

18. A breather outlet as claimed in claim 12 wherein the exhaust outlet has a radius of 25 mm, the vanes have a length of 50 to 75 mm, the trailing edges of the vortex generators are spaced 25 mm from the exhaust outlet, the trailing edges of the vortex generators extend 32 mm from the mast, the attachment edges of the vortex generators have a length of 86 mm, the exhaust outlet is spaced at least 50 mm from the main portion of the mast, the point of intersection of the leading edge of the vortex generator and the attachment edge of the vortex generator is substantially 12 cm from the nacelle and the nearest point of the exhaust outlet is substantially 12 cm from the nacelle.

19. A breather outlet as claimed in claim 1 wherein each vortex generator has a parabolic leading edge.

20. A breather outlet suitable for use with the gearbox of an aircraft mounted gas turbine engine enclosed within a nacelle, the breather outlet comprising a mast containing a breather duct, the mast being adapted to be located on the exterior of the nacelle, the breather duct being operationally interconnected with the interior of the gearbox, the mast comprising a main portion and a sub portion extending generally rearwardly from the main portion, the main portion of the mast being generally aerodynamically shaped between a leading edge and a trailing edge, the sub portion of the mast having an exhaust outlet for the breather duct, the exhaust outlet being generally rearwardly facing with respect to the operational flow of air over the mast and positioned so as to be spaced apart from the nacelle, the exhaust outlet being spaced from the trailing edge of the main portion of the mast, and the breather duct has means to remove the swirl present in the operational air flow through the breather duct.

21. A breather outlet as claimed in claim 20 wherein the means to remove the swirl is located in the breather duct in the sub portion of the mast.

22. A breather outlet as claimed in claim 21 wherein the means to remove the swirl is located at the exhaust outlet.

23. A breather outlet as claimed in claim 22 wherein the means to remove the swirl comprises a plurality of vanes extending across the breather duct in the sub portion of the mast.

24. A breather outlet as claimed in claims 20 wherein the sub portion has a circular cross-section.

25. A breather outlet as claimed in claim 24 wherein the axial length of the vanes is two to three times the radius of the sub portion of the mast.

26. A breather outlet as claimed in claim 24 or claim 25 wherein there are six vanes.

27. A gas turbine engine comprising a breather outlet as claimed in claim 1.

* * * * *